(12) United States Patent
Kim et al.

(10) Patent No.: US 8,471,517 B2
(45) Date of Patent: Jun. 25, 2013

(54) MOTOR CONTROLLING APPARATUS AND MOTOR CONTROLLING METHOD THEREOF

(75) Inventors: Tae-young Kim, Hwaseong-si (KR); Hyoung-il Kim, Hwaseong-si (KR)

(73) Assignee: Samsung Electronics Co., Ltd, Suwon-si (KR)

(*) Notice: Subject to any disclaimer, the term of this patent is extended or adjusted under 35 U.S.C. 154(b) by 627 days.

(21) Appl. No.: 12/723,827

(22) Filed: Mar. 15, 2010

(65) Prior Publication Data

US 2011/0001449 A1    Jan. 6, 2011

(30) Foreign Application Priority Data

Jul. 1, 2009  (KR) .................. 10-2009-0059674

(51) Int. Cl.
*H02P 8/00*    (2006.01)
(52) U.S. Cl.
USPC ............ 318/696; 318/599; 318/671; 318/609

(58) Field of Classification Search
USPC ................ 318/599, 603, 609, 610, 685, 696, 318/671
See application file for complete search history.

(56) References Cited

U.S. PATENT DOCUMENTS

| | | | | | |
|---|---|---|---|---|---|
| 3,579,279 | A | * | 5/1971 | Inaba et al. | 318/696 |
| 3,972,535 | A | * | 8/1976 | Bleiman | 369/266 |
| 4,507,599 | A | * | 3/1985 | Guerin | 318/696 |
| 4,734,631 | A | * | 3/1988 | Kamikura et al. | 318/685 |
| 5,373,206 | A | * | 12/1994 | Lim | 310/68 B |
| 5,378,975 | A | * | 1/1995 | Schweid et al. | 318/685 |
| 5,625,269 | A | * | 4/1997 | Ikeda | 318/696 |
| 6,184,646 | B1 | * | 2/2001 | Yagoshi et al. | 318/696 |

* cited by examiner

*Primary Examiner* — Walter Benson
*Assistant Examiner* — Thai Dinh
(74) *Attorney, Agent, or Firm* — Stanzione & Kim, LLP

(57) ABSTRACT

A motor controlling apparatus includes a control unit which sets a motor on standby for a predetermined time if an enable signal is applied and sets the motor to a default state by rotating the motor at least once for the next predetermined time. The apparatus includes a driver unit which generates a drive signal to control the motor and outputs the drive signal to the motor. Accordingly, a stepping out of the motor may be prevented.

15 Claims, 8 Drawing Sheets

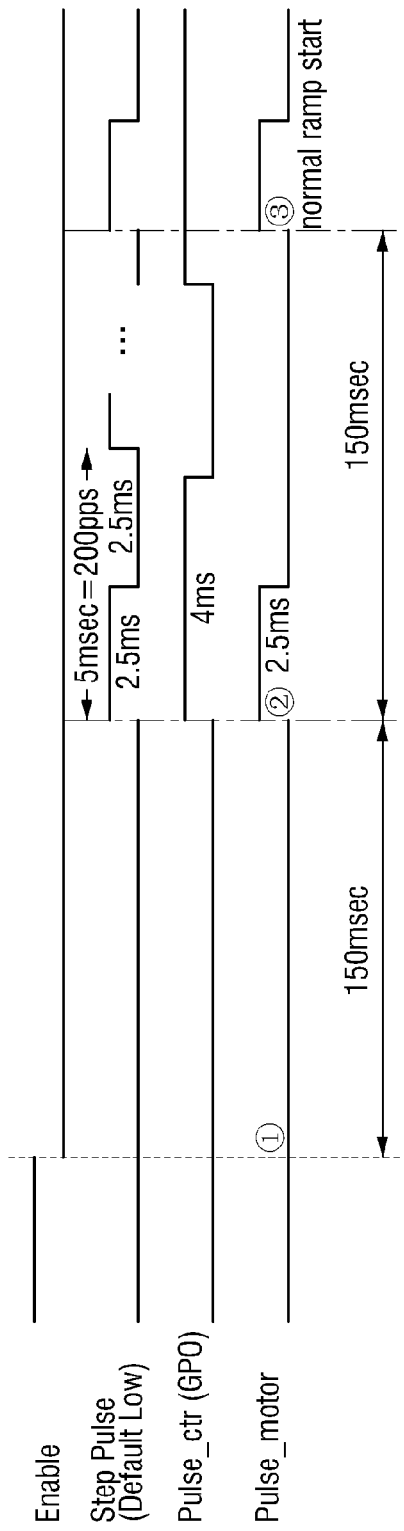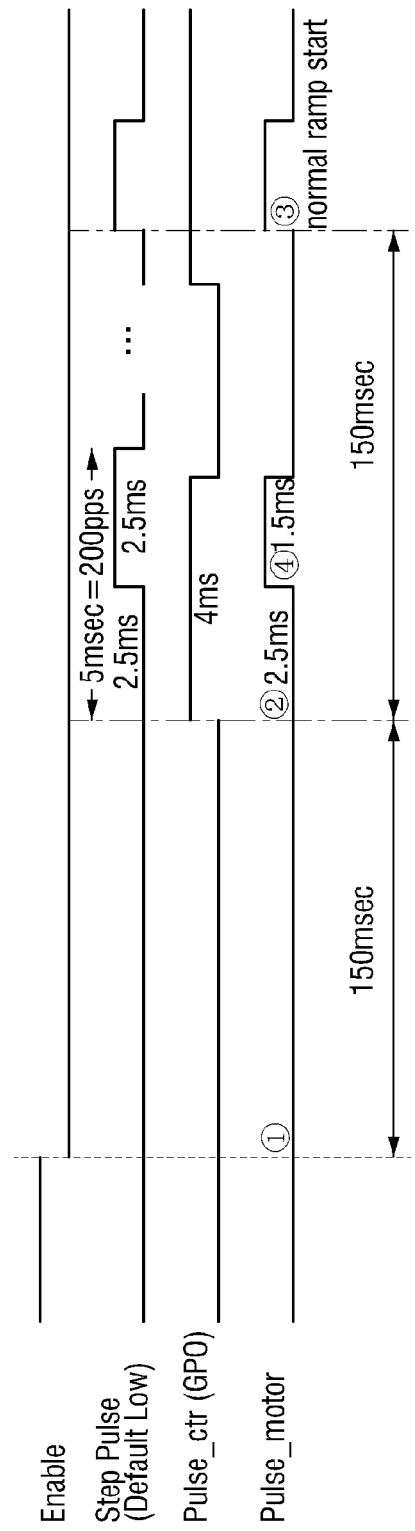

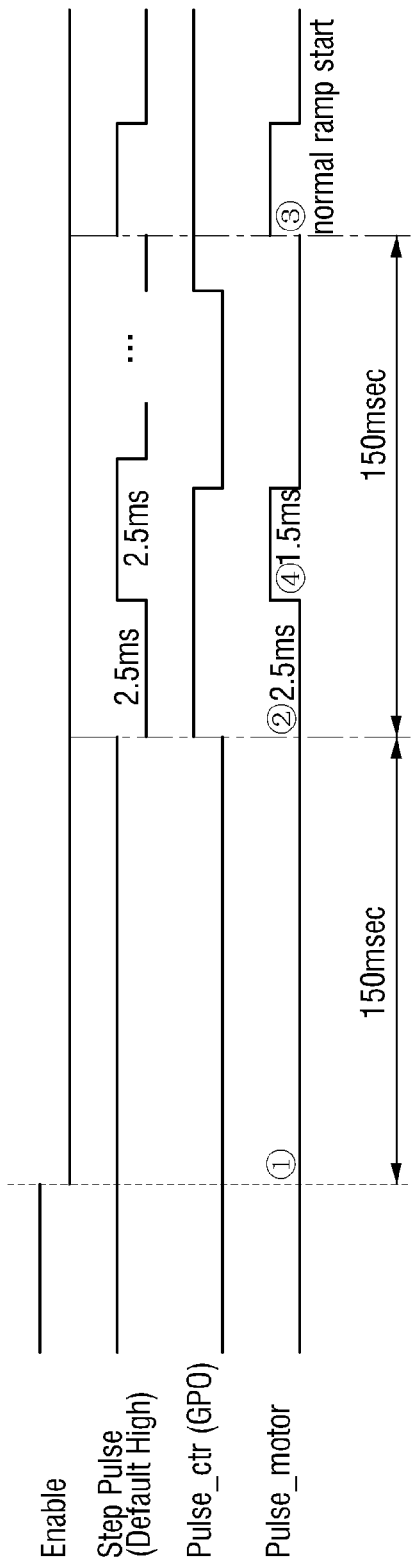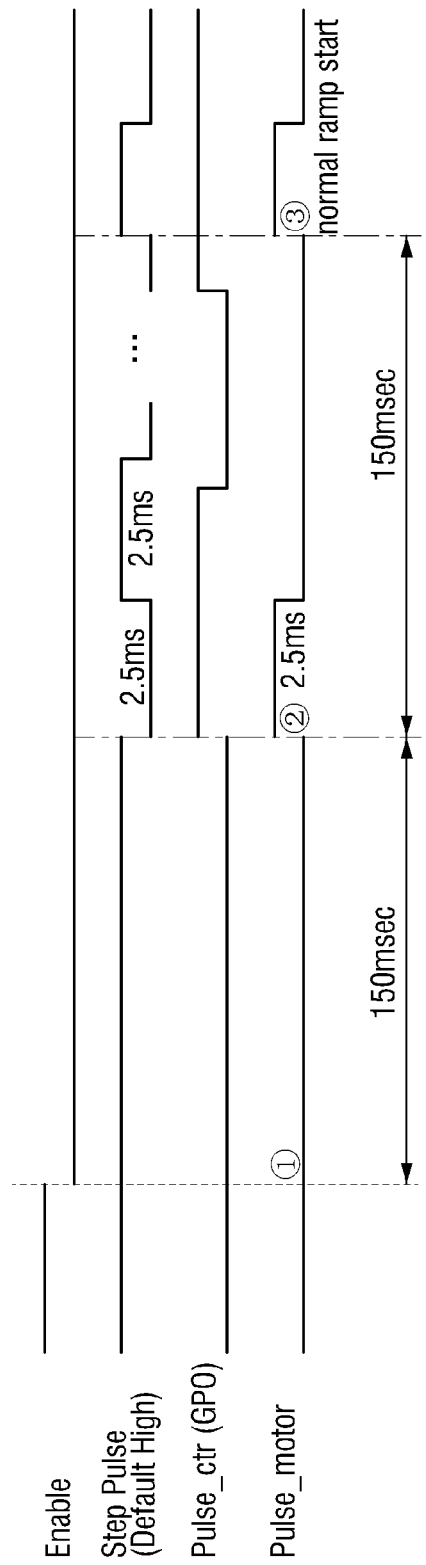

MOTOR CONTROLLING APPARATUS AND MOTOR CONTROLLING METHOD THEREOF

CROSS-REFERENCE TO RELATED APPLICATIONS

This application claims the benefit of priority under 35 U.S.C. §119 from Korean Patent Application No. 10-2009-59674, filed on Jul. 1, 2009, in the Korean Intellectual Property Office, the disclosure of which is incorporated herein by reference in its entirety.

BACKGROUND

1. Field of the Invention

Apparatuses and methods consistent with the present general inventive concept relate to a motor controlling apparatus which prevents a motor from being stepped out and a motor controlling method thereof.

2. Description of the Related Art

An image forming apparatus is an apparatus which generates, prints, receives, and transmits image data. Examples of an image forming apparatus include a printer, a scanner, a copier, a fax machine, and a multi function printer (MFP) which combines features of the printer, scanner, copier, and fax machine.

An image forming apparatus uses motors to perform various functions such as moving or supplying printing papers. Recently, such units as an auto document feeder (ADF) unit, a finisher unit, a high capacity feeder (HCF) unit, and a double capacity feeder (DCF) unit which perform various functions, are attached to an image forming apparatus, and thus, a number of motors used in the image forming apparatus continues to increase. In particular, a step motor is widely used for an image forming apparatus since the step motor is relatively inexpensive and has a high accuracy in moving exactly one step angle for one pulse applied.

A rotation speed of a step motor is controlled using an application specific integrated circuit (ASIC) which is generally set to satisfy requirements of a motor. However, recently, a stepping out of a step motor frequently occurs when an ASIC is set to operate in a high frequency range.

SUMMARY OF THE INVENTION

The present general inventive concept relates to a motor controlling apparatus and a motor controlling method thereof, and provides a motor controlling apparatus which generates a control signal to prevent stepping out of a motor and a motor controlling method thereof.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by a motor controlling apparatus including a motor, a control unit to set the motor on standby for a predetermined time period if an enable signal is applied, rotate the motor at least once for the next predetermined time period, and generate a motor setting signal to set the motor to a default state, and a driver unit to generate a drive signal to control the motor and output the drive signal to the motor according to the generated motor setting signal.

The control unit may include an ASIC unit to generate a step pulse to drive the motor in an acceleration state, constant motion, and a deceleration state, a processor to generate a control signal to widen a pulse interval of the step pulse to correspond to the predetermined time period, and a signal generation unit to generate the motor setting signal using the step pulse and the control signal.

The signal generation unit may be implemented by one of an AND gate or an OR gate.

The motor controlling apparatus may further include a mode determination unit to determine at least one of an excitation state mode and an operation state mode.

The driver unit may generate a drive signal to set the motor to a default state and output the drive signal using the generated motor setting signal and the enable signal if the mode determination unit determines that a current mode is an excitation state mode.

The ASIC unit may generate a pulse width modification signal, and the driver unit may generate a drive signal to set the motor in the acceleration state, the constant motion, and the deceleration state using a pulse width modification signal generated by the ASIC unit if the mode determination unit determines that a current mode is an operation state mode.

A period of the motor setting signal may be longer than a period of the step pulse and has a minimum value of 100 ms.

The foregoing and/other aspects and utilities of the general inventive concept may also be achieved by a motor controlling method of a motor controlling apparatus, according to an exemplary embodiment of the general inventive concept, may include generating a motor setting signal to set the motor to a default state by having the motor on standby for a predetermined time period and rotating the motor at least once for the next predetermined time period and generating a drive signal to control the motor and output the drive signal to the motor according to the generated motor setting signal.

The motor controlling method may further include generating a step pulse to drive the motor in an acceleration state, constant motion, and a deceleration state, generating a control signal to widen a pulse width of the step pulse to correspond to the predetermined time period, and generating the motor setting signal using the step pulse and the control signal.

The generating the motor setting signal may be implemented by one of an AND gate and an OR gate.

The motor controlling method may further include determining at least one of an excitation status mode and an operation status mode.

The drive signal is provided to set the motor to a default state using the generated motor setting signal and the enable signal if a mode is determined to be an excitation mode.

The drive signal is provided to set the motor in the acceleration state, the constant motion, and the deceleration state using the generated pulse width modification signal.

A period of the motor setting signal may be longer than a period of the step pulse and has a minimum value of 100 ms.

The foregoing and/other aspects and utilities of the general inventive concept may also be achieved by a motor controlling method of a motor controlling apparatus, including generating a signal to set the motor in a default state, and applying a step pulse to the motor to drive the motor and rotate the motor according to the step pulse, wherein a predetermined time to set the motor in a default state is longer than a period of time of the step pulse applied to the motor to prevent a stepping out of the motor.

The signal to the set the motor in the default state may be generated by having the motor on standby for a predetermined time period and rotating the motor at least once for the next predetermined time period.

The step pulse may be provided to drive the motor in an acceleration state, a constant motion, and a deceleration state.

The foregoing and/or other aspects and utilities of the general inventive concept may also be achieved by a computer-readable recording medium having embodied thereon a computer program that, when executed by a computer, performs a method of controlling a motor of a motor controlling apparatus, wherein the method includes generating a motor setting signal to set the motor to a default state by having the motor on standby for a predetermined time period and rotating the motor at least once for the next predetermined time period, and generating a drive signal to control the motor and output the drive signal to the motor according to the generated motor setting signal The foregoing and/or other aspects and utilities of the general inventive concept may also be achieved by a motor controlling apparatus to control a step motor of an image forming apparatus, including a control unit to generate a step pulse to drive a step motor in an operation state of acceleration, constant motion, and deceleration, to keep clock information, and to generate a control signal to widen a pulse interval of the generated step pulse.

The control unit may also include an ASIC unit to generate the step pulse to drive the step motor and a processor to generate the control signal to widen the pulse interval of the generated step pulse.

The control unit may also include a signal generation unit to generate a step motor setting signal using the step pulse and the control signal.

The motor controlling apparatus may also include a driver unit to generate a drive signal to control the step motor and output the drive signal to the step motor according to the generated step motor setting signal.

BRIEF DESCRIPTION OF THE DRAWINGS

The above and/or other features and utilities of the present general inventive concept will become apparent and more readily appreciated from the following description of the exemplary embodiments, taken in conjunction with the accompanying drawings, in which:

FIG. 6A through 6D are views provided to illustrate various examples of generating a motor setting signal;

DETAILED DESCRIPTION OF THE EMBODIMENTS

Figure 1:
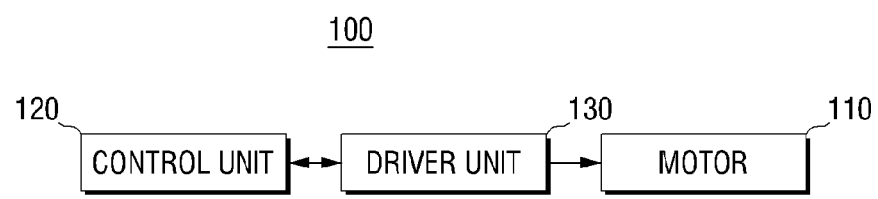
FIG. 1 is a view illustrating a motor controlling apparatus according to an embodiment of the general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a view illustrating a motor controlling apparatus according to an embodiment of the general inventive concept. Referring to FIG. 1, the motor controlling apparatus 100 includes a motor 110, a control unit 120, and a driver unit 130.

The motor 110 may be a step motor. The step motor is a motor 110 which moves at a predetermined angle corresponding to an input pulse, and controls a rotation angle accurately. In addition, the step motor may output various phases such as 4 phases or 6 phases.

If an enable signal is applied, the control unit 120 has the motor 110 on standby for a predetermined time, rotates the motor 110 at least once for the next predetermined time, and generates a motor setting signal to set the motor 110 to a default state.

The default state represents a state where the motor 110 is disposed at a standard location. For instance, when the motor 110 stops rotating, the motor 110 may be stopped at 0 degrees or may be stopped at 7 degrees according to the phase of the motor 110. Alternatively, the motor 110 may be stopped at 1 degree which is not a determined step angle such as 0 degrees or 7 degrees. If the motor 110 rotates again in this state, the rotating angle of the motor 110 may be distorted since the motor 110 is not disposed at the standard location. In order to address this situation, the control unit 120 generates a motor setting signal to set the motor 110 to a default state.

The predetermined time to set the motor 110 on standby and the predetermined time to rotate the motor 110 at least once may be different. It may be more desirable, however, if the predetermined time to set and to rotate the motor 110 are the same. The predetermined time period to rotate the motor 110 may be much longer than a period of time of a pulse wave (step pulse) applied to the motor 110 when the motor 110 is actually operated. The predetermined time to rotate the motor 110 may be pre-stored in a storage unit (not shown).

The motor 110 may be rotated once or twice with respect to a step angle. A step pulse is applied when the step motor is not rotated. As such, the step out of a step motor that rotates according to a step pulse, which is applied while the step motor is not rotated, may be prevented.

The driver unit 130 generates a drive signal to control the motor 110 according to the generated motor setting signal and outputs the drive signal to the motor 110. The driver unit 130 may be implemented as an integrated circuit having a plurality of input ports and a plurality of output ports.

The motor controlling apparatus 100 may be used in an apparatus which requires accurate controlling such as a printer, a scanner, a copier, a fax machine, and a multi function printer (MFP) which combines the features of the printer, scanner, copier, and fax machine.

Figure 2:
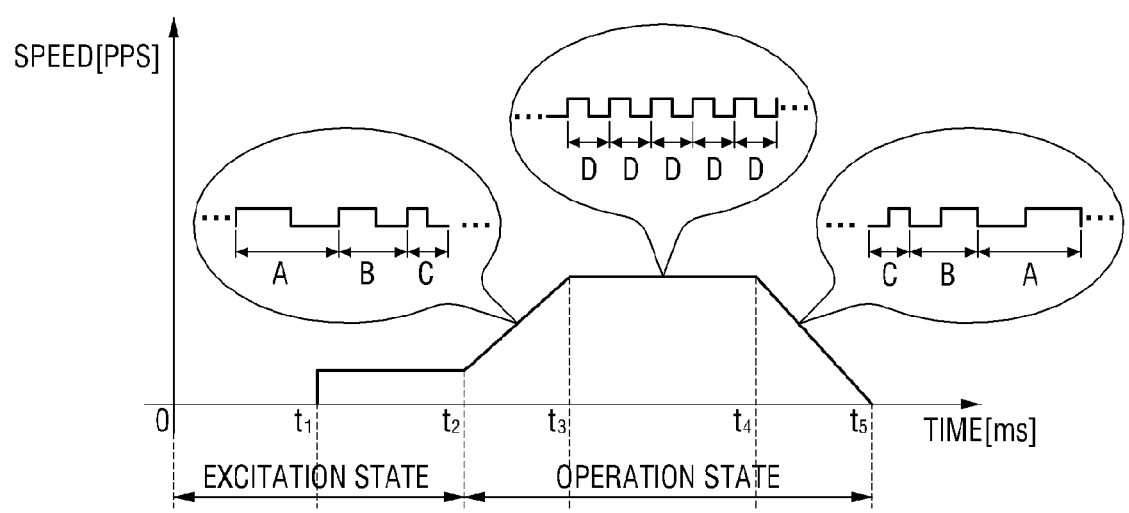
FIG. 2 is a view provided to illustrate various operation modes of a motor.

FIG. 2 is a view provided to illustrate various operation modes of the motor 110. Referring to FIG. 2, the motor 110 may include an excitation state (or a standby state) to prepare rotation prior to an actual rotation of the motor 110, and an operation state in which the motor 110 is actually rotated. The excitation state may include a state in which an enable signal is applied as in section $0 \sim t_1$ while other signals are not applied for a predetermined time period. The excitation state may also include a state in which an enable signal is applied as in section $t_1 \sim t_2$ and a signal is input so that the motor 110 is set to a default state for the next predetermined time period after a predetermined time of $t_1$ elapses. The detailed description regarding the excitation state will be provided with reference to relevant figures.

The operation state of the motor 110 may include an acceleration section in which the motor 110 is accelerated as in section $t_2$~$t_3$, a constant rotation section in which the motor 110 is fully accelerated and maintains constant motion (rotation) as in $t_3$~$t_4$, and a deceleration section in which the motor 110 is decelerated as in section $t_4$~$t_5$. For example, if the motor 110 is used in a feeding roller of a feeder of an image forming apparatus, and the image forming apparatus receives a printing command from a host apparatus, the motor 110 may be stopped as the stopped motor 110 is being accelerated, rotated at a constant velocity, and being decelerated as the printing is completed.

As described in FIG. 2, in section $t_2$~$t_3$ in which the motor 110 is accelerated, the interval between pulses (or pulse repetition period) gets shorter as in A, B, and C. In section $t_3$~$t_4$ in which the motor 110 moves at constant velocity (rotation), the interval between pulses (D) is constant, and in section $t_4$~$t_5$ in which the motor is decelerated, the interval between pulses gets wider.

Accordingly, the motor 110 is set to be on standby for a predetermined time, of which the step angle may be rotated once or twice for the predetermined time, which may be set to a longer time than the period of time of the pulse waves applied to the motor 110 when the motor 110 is in an operation mode. As such, the step out of the motor which could occur due to high frequency of pulses (step pulses) applied to drive the motor 110 may be prevented since the step pulses are applied to the motor 110 when the motor 110 is not rotated and the predetermined time period for the rotation of the step angle is set to a longer time period of the pulse waves applied to the motor 110.

Figure 3:
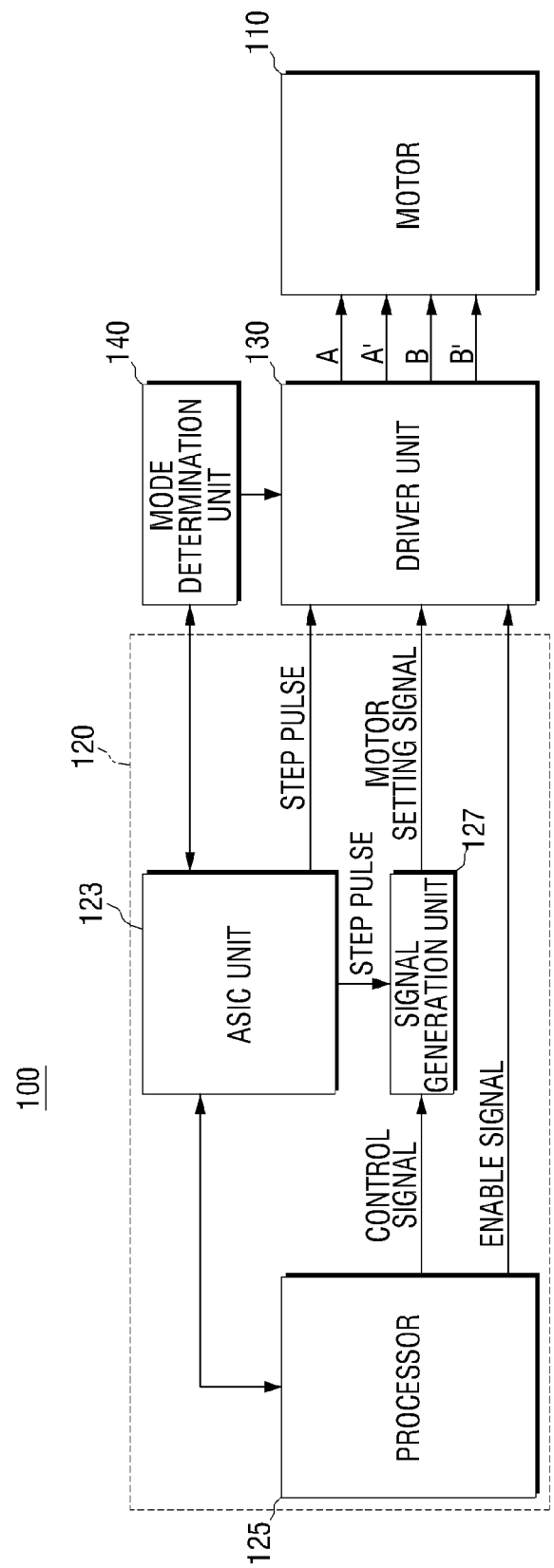
FIG. 3 is a detailed view of the motor controlling apparatus in FIG. 1.

FIG. 3 is a detailed view of the motor controlling apparatus in FIG. 1. Referring to FIG. 3, the motor controlling apparatus 100 may further include a mode determination unit 140 in addition to the motor 110, the control unit 120, and the driver unit 130. The control unit 120 may include an ASIC unit 123, a processor 125, and a signal generation unit 127.

The ASIC unit 123 may generate a step pulse to drive the motor 110 in an operation state of acceleration, constant motion, and deceleration. The ASIC unit 123 generates a pulse of which an interval gets shorter as time elapses in an acceleration state, a constant motion state, and further generates a pulse of which an interval gets wider in a deceleration state. The ASIC unit 123 may further include a clock unit (not shown) which keeps clock information regarding a pulse interval and a register (not shown) which stores information regarding a pulse interval during the acceleration state and the deceleration state.

The processor 125 may generate a control signal to widen a pulse interval of a step pulse output from the ASIC unit 123. The generated control signal may be applied, for example, when a predetermined time elapses after an enable signal is applied and the next predetermined time elapses. The control signal may be output from an output terminal of the processor 125.

The signal generation unit 127 may generate a motor setting signal using a step pulse and a control signal. A period of time to output the motor setting signal is longer than that of a step pulse output from the ASIC unit 123, and may have a minimum value of 100 ms. The signal generation unit 127 may be implemented as one logical element such as an AND gate and an OR gate.

In another embodiment of the present general inventive concept, the processor 125 may be implemented as an integrated circuit, and may include the ASIC unit 123 and the signal generation unit 127.

The signal generation unit 127 may generate a low frequency pulse that can be used in an excitation state by using an output signal of the ASIC unit 123. Generally, a high frequency pulse is set to be used by the ASIC unit 123.

The mode determination unit 140 may determine one of an excitation mode and an operation state mode. As illustrated in FIG. 2, after an excitation mode, an operation state such as an acceleration state, constant motion, and a deceleration state of the motor 110 may be determined. If an enable signal is applied from the processor 125 to the driver unit 130, the mode determination unit 140 may determine that a current mode is an excitation mode, and terminates the excitation mode and begins an operation mode when a predetermined time elapses after the enable signal is applied and the next predetermined time elapses.

Specifically, the mode determination unit 140 may be implemented as a multiplexer, and if the mode determination unit 140 determines that a current mode is an excitation mode, the mode determination unit 140 may request the processor 125 to use the signal generation unit 127 directly or via the ASIC unit 123. If the mode determination unit 140 determines that a current mode is an operation mode, the mode determination unit 140 may request the ASIC unit 123 to generate a pulse interval modification signal without using the signal generation unit 127.

In the case that the mode determination unit 140 determines that the current mode is the excitation mode, the driver unit 130 may generate a drive signal to set the motor 110 to a default mode using a motor setting signal generated and output from the signal generation unit 127, and an enable signal output from the processor 125.

In the case that the mode determination unit 140 determines that the current mode is an operation mode, the driver unit 130 may output a drive signal to set the motor 110 to an acceleration state, a constant motion, and a deceleration state using a pulse interval modification signal generated and output from the ASIC unit 123.

According to the present general inventive concept, the step out of the motor 110 may be prevented. In addition, by modifying a signal output from the ASIC unit 123, the step out of the motor 110 may be prevented in a relatively simple way.

Figure 4:
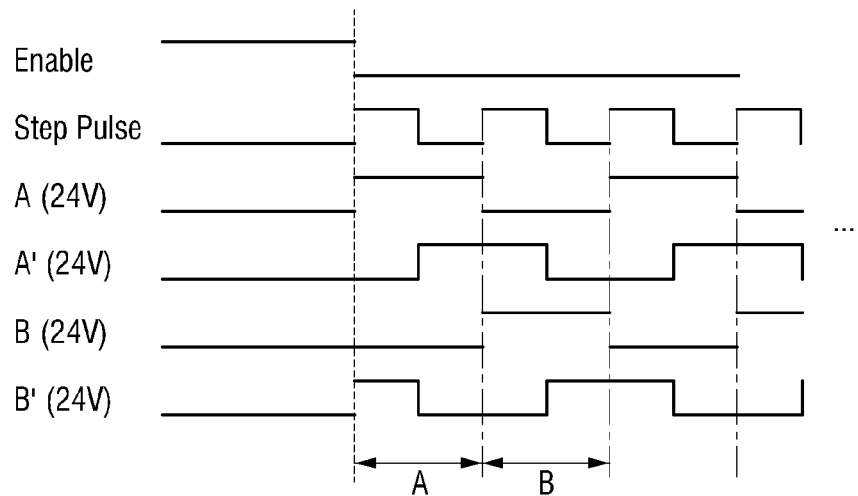
FIG. 4 is a view provided to illustrate a drive signal output from a driver unit.

FIG. 4 is a view provided to illustrate a drive signal output from driver unit 130. Referring to FIG. 3 and FIG. 4, a drive signal having four phases of A, A', B, and B' may be generated, or a drive signal having various phases may be generated. In FIG. 4, with respect to a drive signal output from the driver unit in an operation state, the phase of the motor may be controlled according to the number of pulses and the location of a rising edge. For instance, if $\theta_1$ is 3.5 degrees, and a signal of section A is output, the motor moves at 3.5 degrees which is a step angle, and if a signal of section B is output, the motor moves at 3.5 degrees again.

Figure 5:
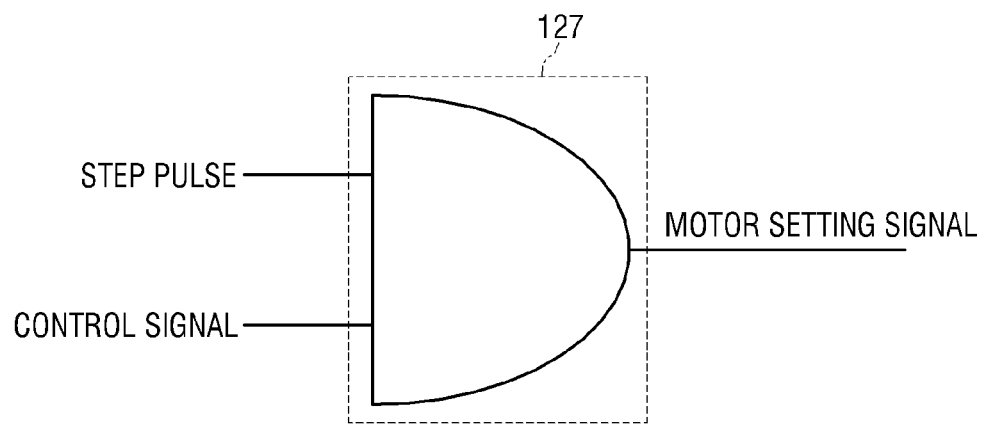
FIG. 5 is a view illustrating an example of a signal generation unit.

FIG. 5 is a view illustrating an example of a signal generation unit 127. FIG. 6A through 6D are views provided to illustrate various examples of generating a motor setting signal.

Referring to FIG. 5, the signal generation unit 127 may be implemented using an AND gate. Specifically, referring to an excitation state as illustrated in FIG. 6A, an enable signal may be applied from the processor 125 to the driver unit 130 at interval ①. As illustrated in FIG. 6A, the enable signal may be applied in a "LOW" state. However, the enable signal may be applied in the "LOW" state or in a "HIGH" state.

The ASIC unit 123 may be on standby during the section of 150 msec for a predetermined time, and apply a step pulse (Step Pulse) having a pulse interval of 5 msec to the signal generation unit 127 at interval ② after the section of 150 msec passes in interval ①. The step pulse having a pulse interval of 5 msec is a pulse that could be generated for an acceleration state or deceleration state of the ASIC 123.

Likewise, a control signal (Pulse_ctr) generated and output from the processor 125 may apply a signal in a "HIGH" state of 4 ms at the signal interval of 150 msec to the signal generation unit 127 at interval ②.

The signal generation unit 127 may, for example, receive a step pulse and a control pulse and output a motor setting signal (Pulse_motor) in a "HIGH" state of the first 2.5 ms at the signal interval of 150 msec using an AND gate. The driver unit 130 may generate a drive signal to move the motor 110 by one or two step angles by identifying a rising edge of the motor setting signal generated by the signal generation unit 127.

The time when the motor setting signal is "HIGH" is not that important. If the rising edge which is changed from "LOW" to "HIGH" can be detected in the motor setting signal, that is generally enough. An operation state will be described hereinafter with reference to FIG. 6B.

If the motor 110 continues to be accelerated at interval ③, the driver unit 130 may generate a drive signal to accelerate the motor 110 using a pulse interval modification signal generated by the ASIC 123 according to a determination of the mode determination unit 140. Specifically, if the mode determination 140 determines that a current mode is an operation state mode, the mode determination unit 140 may request the ASIC unit 123 to generate a pulse interval modification signal without using the signal generation unit 127. Accordingly, the driver unit 130 may generate a drive signal to accelerate the motor 110 according to the pulse interval modification signal of the ASIC unit 123.

FIG. 6B is the same as FIG. 6A except that the step pulse is applied in a "LOW" state at interval ②. Likewise, the driver unit 130 may generate a drive signal to rotate the motor 110 at least once by identifying a rising edge of the motor setting signal generated by the signal generation unit 127.

FIG. 6C is the same as FIG. 6A except that the step pulse is applied in a "HIGH" state before interval ② and starts in a "LOW" state at interval ②. In addition, FIG. 6D is the same as FIG. 6A except that the step pulse is applied in a "HIGH" state before interval ②.

By way of example, as illustrated in FIGS. 6A through 6D, the signal generation unit 127 may be implemented using an AND gate. According to other embodiments of the present general inventive concept, the signal generation unit 127 may be implemented using one of an NAND gate and an XOR gate in FIGS. 6A through 6D. However, using an AND gate may be relatively cheaper than using an NAND gate and an XOR gate.

According to anther embodiment of the present general inventive concept, the step pulse output from the ASIC unit 123 may be set to be in a "HIGH" state at interval ② in FIGS. 6A through 6D and the set step pulse signal may be applied to the signal generation unit 127. Likewise, the signal generation unit 127 may be implemented using an AND gate as illustrated in FIGS. 6A through 6D.

Figure 7:
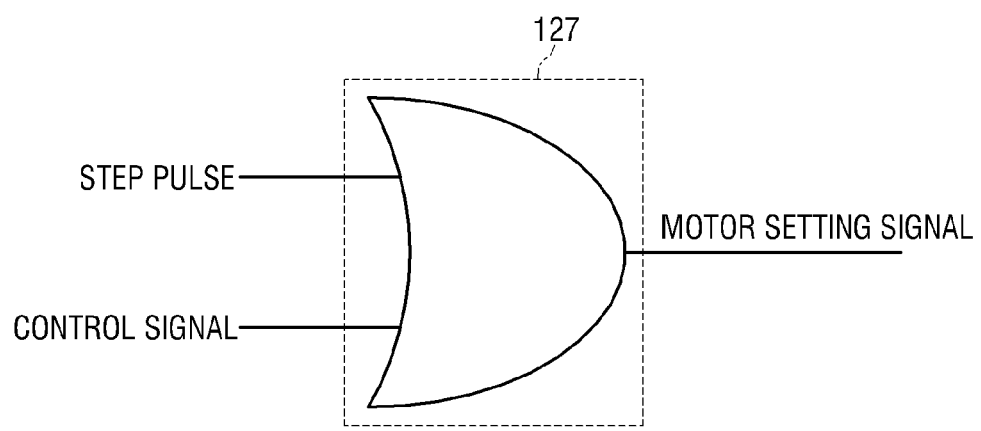
FIG. 7 is a view illustrating an example of a signal generation unit.
Figure 8A:
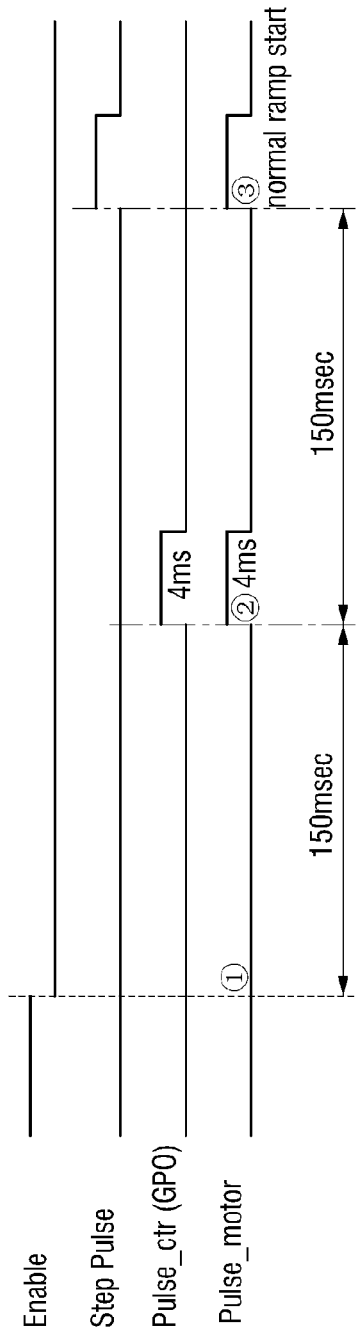
FIGS. 8A and 8B are views provided to illustrate various examples of generating a motor setting signal.
Figure 8B:
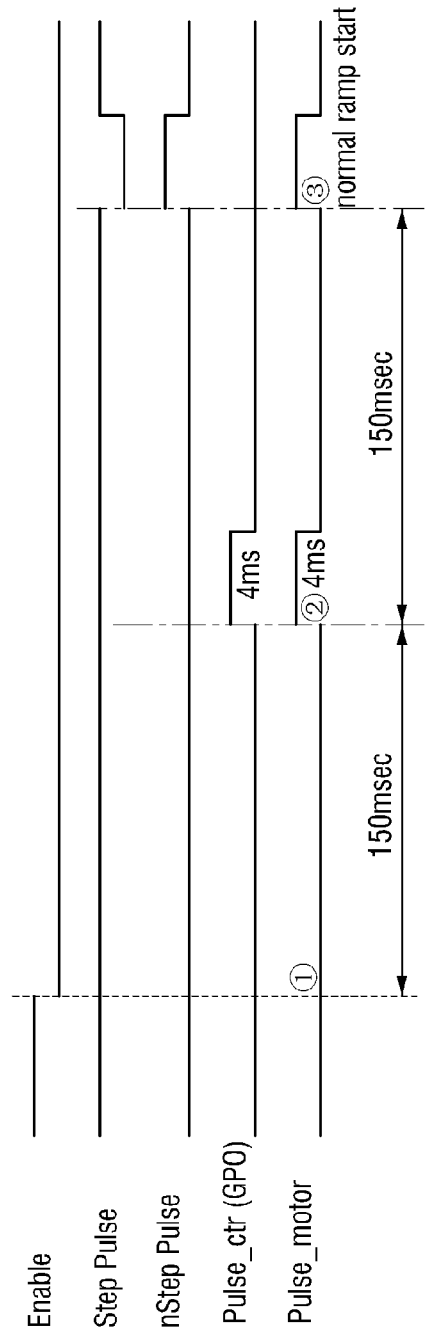

FIG. 7 is a view illustrating an illustration of the signal generation unit 127. FIGS. 8A and 8B are views provided to illustrate various examples of generating a motor setting signal.

Referring to FIG. 7, the signal generation unit 127 may be implemented using an OR gate. Specifically, referring to FIG. 8A, an enable signal may be applied at interval ①. The ASIC unit 123 may be on standby during the section of 150 msec for a predetermined time, and apply a step pulse having a pulse interval in a "LOW" state to the signal generation unit 127 at interval ② after the section of 150 msec passes. On the other hand, a control signal generated and output from the processor 125 may apply a signal in a "HIGH" state of 4 ms at the signal interval of 150 msec to the signal generation unit 127 at interval ②. The signal generation unit 127 may receive a step pulse and a control pulse and output a motor setting signal in a "HIGH" state of the first 4 ms at the signal intervals of 150 msec using an OR gate.

Referring to FIG. 8B, the step pulse output from the ASIC unit 123 at interval ② is in a "HIGH" state while the step pulse passing through an inverter is in a "LOW" state, and thus the actual signal input to the signal generation unit 127 is practically the same as FIG. 8A.

By way of example, as illustrated in FIGS. 8A and 8B, the signal generation unit 127 may be implemented using an AND gate. According to other embodiments of the present general inventive concept, the signal generation unit 127 may be implemented using one of an NAND gate and an XOR gate in FIGS. 8A and 8B. However, using an OR gate may be relatively cheaper than using an NAND gate and an XOR gate.

Figure 9:
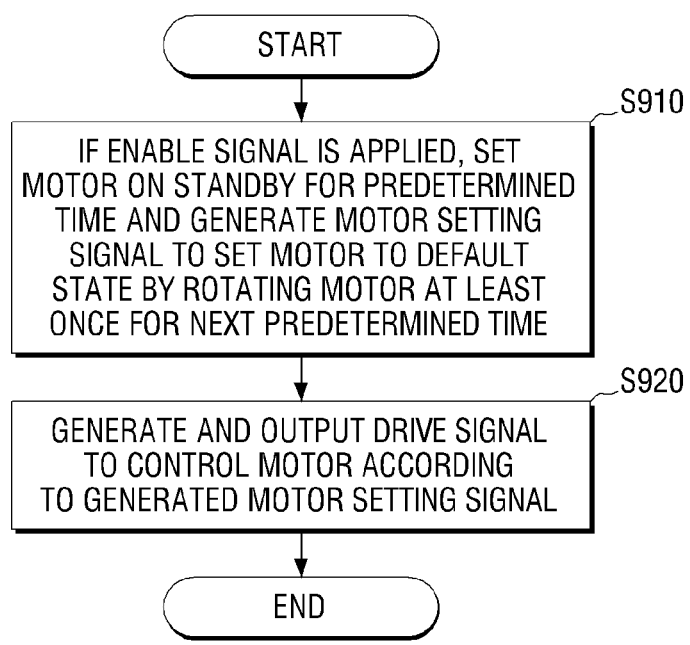
FIG. 9 is a flow chart illustrating a motor controlling method of a motor controlling apparatus according to an embodiment of the present general inventive concept.

FIG. 9 is a flow chart illustrating a motor controlling method of a motor controlling apparatus according to an embodiment of the present general inventive concept.

Referring to FIG. 9, according to the motor controlling method, if an enable signal is applied, the control unit 120 sets the motor 110 to be on standby for a predetermined time and rotates the motor 110 at least once for the next predetermined time so as to generate a motor setting signal to set the motor to a default state at operation S910.

A drive signal to control the motor 110 is generated and output to the motor 110 according to the motor setting signal generated by the driver unit 130 at operation S920.

In the operation of generating a motor setting signal (S910), a step pulse to drive the motor 110 in an acceleration state, constant motion, and a deceleration state may be generated, a control signal to widen a pulse interval of the step pulse to correspond to a time period may be generated, and a motor setting signal may be generated using the step pulse and the control signal.

The motor controlling method of the motor controlling apparatus may further include an operation (not shown) that the mode determination unit 140 determines one of an excitation state mode and an operation state mode. One of the excitation state mode or the operation state mode may be determined before or after the operation of generating a motor setting signal (S910).

As described above, the present invention may include a computer readable recording medium including a program for executing the motor controlling method of the motor controlling apparatus. The computer readable recording medium includes all sorts of recording apparatuses in which data readable in a computer system are stored. Examples of the computer readable recording medium include a ROM, a RAM, a CD-ROM, a magnetic tape, a floppy disk, and an optical data storing apparatus. Since the computer readable recording medium is distributed to a computer system connected through a network, a code that a computer can read through a distribution method may be stored and executed.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A motor controlling apparatus, comprising:
   a motor;
   a control unit to set the motor on standby for a predetermined time period if an enable signal is applied, rotate the motor at least once for the next predetermined time period, and generate a motor setting signal to set the motor to a default state; and
   a driver unit to generate a drive signal to control the motor and output the drive signal to the motor according to the generated motor setting signal.

2. The motor controlling apparatus as claimed in claim 1, wherein the control unit comprises:
   an ASIC unit to generate a step pulse to drive the motor in an acceleration state, constant motion, and a deceleration state;
   a processor to generate a control signal to widen a pulse interval of the step pulse to correspond to the predetermined time period; and
   a signal generation unit to generate the motor setting signal using the step pulse and the control signal.

3. The motor controlling apparatus as claimed in claim 2, wherein the signal generation unit is implemented by one of an AND gate or an OR gate.

4. The motor controlling apparatus as claimed in claim 2, further comprising:
   a mode determination unit to determine at least one of an excitation state mode and an operation state mode.

5. The motor controlling apparatus as claimed in claim 4, wherein the driver unit generates a drive signal to set the motor to a default state and outputs the drive signal using the generated motor setting signal and the enable signal if the mode determination unit determines that a current mode is an excitation state mode.

6. The motor controlling apparatus as claimed in claim 4, wherein the ASIC unit generates a pulse width modification signal, and the driver unit generates a drive signal to set the motor in the acceleration, the constant motion, and the deceleration state using a pulse width modification signal generated by the ASIC unit if the mode determination unit determines that a current mode is an operation state mode.

7. The motor controlling apparatus as claimed in claim 2, wherein a period of the motor setting signal is longer than a period of the step pulse and has a minimum value of 100 ms.

8. A motor controlling method of a motor controlling apparatus, comprising:
   generating a motor setting signal to set the motor to a default state by having the motor on standby for a predetermined time period and rotating the motor at least once for the next predetermined time period if an enable signal is applied; and
   generating a drive signal to control the motor and output the drive signal to the motor according to the generated motor setting signal.

9. The motor controlling method as claimed in claim 8, further comprising:
   generating a step pulse to drive the motor in an acceleration state, constant motion, and a deceleration state;
   generating a control signal to widen a pulse width of the step pulse to correspond to the predetermined time period; and
   generating the motor setting signal using the step pulse and the control signal.

10. The motor controlling method as claimed in claim 9, wherein the generating the motor setting signal is implemented by one of an AND gate and an OR gate.

11. The motor controlling method as claimed in claim 9, further comprising:
    determining at least one of an excitation status mode and an operation status mode.

12. The motor controlling method as claimed in claim 11, wherein the drive signal is provided to set the motor to a default state using the generated motor setting signal and the enable signal if a mode is determined to be an excitation mode.

13. The motor controlling method as claimed in claim 11, wherein the drive signal is provided to set the motor in the acceleration state, the constant motion, and the deceleration state using the generated pulse width modification signal.

14. The motor controlling method as claimed in claim 9, wherein a period of the motor setting signal is longer than a period of the step pulse and has a minimum value of 100 ms.

15. A computer-readable recording medium having embodied thereon a computer program that, when executed by a computer, performs a method of controlling a motor of a motor controlling apparatus, wherein the method comprises:
    generating a motor setting signal to set the motor to a default state by having the motor on standby for a predetermined time period and rotating the motor at least once for the next predetermined time period if an enable signal is applied; and
    generating a drive signal to control the motor and output the drive signal to the motor according to the generated motor setting signal.

* * * * *